United States Patent [19]
Deminet et al.

[11] B 3,981,294
[45] Sept. 21, 1976

[54] ALL GLASS COMPOSITE BUILDING PANELS

[75] Inventors: Czeslaw Deminet, Kent; Roger B. Gillette, Auburn, both of Wash.

[73] Assignee: The Boeing Company, Seattle, Wash.

[22] Filed: Oct. 7, 1974

[21] Appl. No.: 512,745

[44] Published under the second Trial Voluntary Protest Program on January 13, 1976 as document No. B 512,745.

Related U.S. Application Data

[63] Continuation-in-part of Ser. No. 416,539, Nov. 16, 1973, abandoned.

[52] U.S. Cl..................................... 126/271; 52/616
[51] Int. Cl.[2]............................................. F24J 3/02
[58] Field of Search .............. 126/270, 271; 52/171, 52/209, 616

[56] References Cited
UNITED STATES PATENTS

| | | | |
|---|---|---|---|
| 504,544 | 9/1893 | Van der Heyden............. | 126/270 X |
| 991,161 | 5/1911 | McHenry......................... | 126/271 X |
| 1,124,778 | 1/1915 | Meuler............................... | 52/616 |
| 1,575,309 | 3/1926 | Anderson........................... | 126/271 |
| 2,608,968 | 9/1952 | Moseley............................. | 126/271 |
| 2,783,682 | 3/1957 | Swenson ....................... | 126/271 UX |
| 2,998,005 | 8/1961 | Johnston............................ | 126/270 |
| 3,102,532 | 9/1963 | Shoemaker......................... | 126/270 |
| 3,107,052 | 10/1963 | Garrison .......................... | 126/271 X |
| 3,192,575 | 7/1965 | Rosenau et al....................... | 52/171 |

FOREIGN PATENTS OR APPLICATIONS

1,138,992  1/1969  United Kingdom.................. 52/616

*Primary Examiner*—Kenneth W. Sprague
*Assistant Examiner*—James C. Yeung
*Attorney, Agent, or Firm*—Donald A. Streck

[57] ABSTRACT

An all glass composite building panel suitable for use as an integral structural member in roofs, ceilings, walls, and floors. The panel is constructed of three layers of glass separated by integral raised walls fused to the adjacent glass layers to define three possible combinations of two enclosed spaces; two layers of contiguous individual vacuum cells; one layer of contiguous individual vacuum cells and one layer comprising a serpentine passageway for liquid flow therethrough, said serpentine passage containing a heat absorptive material; or two layers comprising individual serpentine passageways for liquid flow.

2 Claims, 12 Drawing Figures

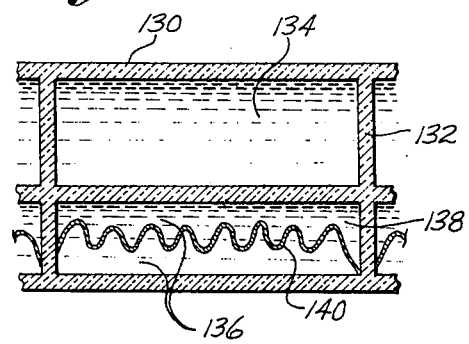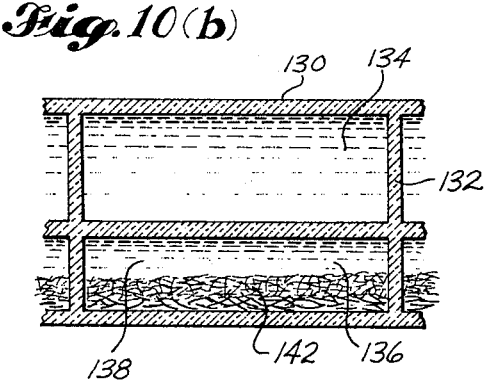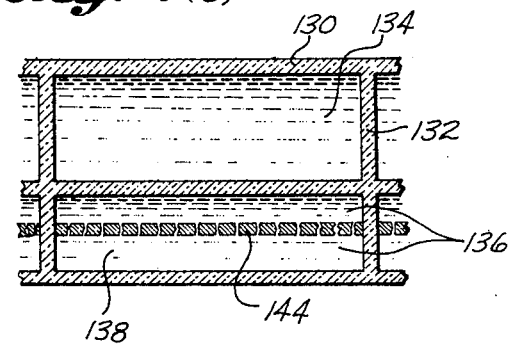

ALL GLASS COMPOSITE BUILDING PANELS

This is a continuation, in part, of application Ser. No. 416,539, filed Nov. 16, 1973 now abandoned.

BACKGROUND OF THE INVENTION

1. Field of the Invention

The present invention relates to composite glass building panels and more particularly to composite glass building panels for inclusion in solar and conventional heating and cooling systems.

2. Description of the Prior Art

The idea of absorbing heat from solar energy into a fluid in an insulated heat exchanger is not new. In the prior art teaching, however, the fluid is passed through an opaque passageway. The solar energy strikes the opaque walls of the passageway and is converted to heat. The heat is then absorbed by the passing fluid by conduction. Such systems have numerous shortcomings to practical use and public acceptance.

First, they are inefficient. Only the fluid in direct contact with the walls of the passageway is adding energy to the system. Since the passageways are normally made of metal, they act as a heat sink and retain much of the absorbed heat.

Next, they are architecturally unacceptable. They are devices to be added to or hung on a building. They are not aesthetically or structurally compatible for incorporation into the building itself.

Further, they are high in cost, not easily mass produced, require strategic non-readily available materials such as aluminum, brass, and copper, and require maintenance to repair damage and deterioration due to atmospheric conditions. In addition, moisture condensation on nonevacuated glass panels is a constant problem.

Finally, they are single purpose devices. That is, they are only useful to collect solar energy as heat.

Therefore, it is an object of the present invention to provide a solar energy collector panel which is highly efficient, while requiring minimal maintenance and possessing durability under all atmospheric conditions.

It is another object of the present invention to provide a solar energy collector panel utilizing non-strategic, readily available materials in a manner that can be mass produced at low cost.

It is yet another object of the present invention to provide a solar energy collector panel that is architecturally acceptable aesthetically as well as in weight and strength.

It is a further object of the present invention to provide a solar energy collector panel that is multi-purpose. Adaptable for different use by time of year, geographical location, and time of day. Adaptable for use as a heat radiator, insulator, and heat exchanger as well as an energy/heat collector.

It is yet a further object of the present invention to provide a solar energy collector panel that can be used as the major element in a thermal control system for buildings. Such major element to provide energy for heating in winter and cooling in summer while maximizing solar heat gain to the building in winter and minimizing solar heat gain to the building in summer. In addition, such major element to replace conventional wall and ceiling structure with variable-reflectance solar collectors.

DESCRIPTION OF THE DRAWINGS

FIG. 10(a) is a cross section through a glass solar heat collector panel containing a heat absorbing membrane in the liquid passageway.

FIG. 10(b) is a cross section through a glass solar heat collector panel containing a fibrous or porous material for heat absorption in the liquid passageway.

FIG. 10(c) is a cross section through a glass solar heat collector panel containing a porous membrane for heat absorption in the liquid passageway.

DESCRIPTION AND OPERATION OF THE PREFERRED EMBODIMENT

Figure 1:
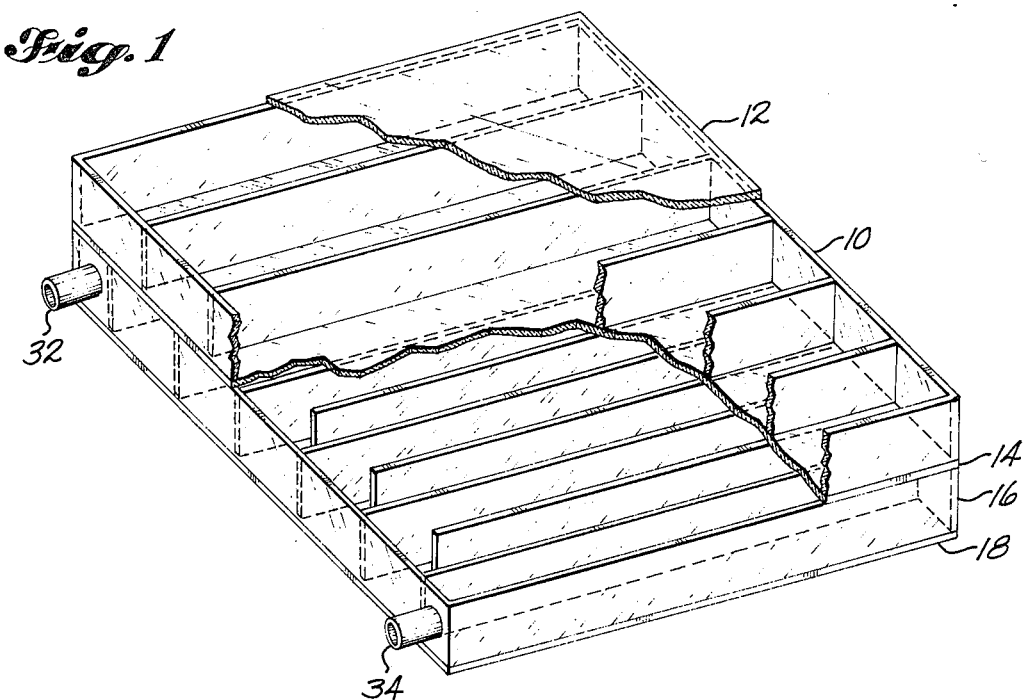
FIG. 1 depicts a glass solar heat collector panel as contemplated by the preferred embodiment of the present invention.
Figure 2:
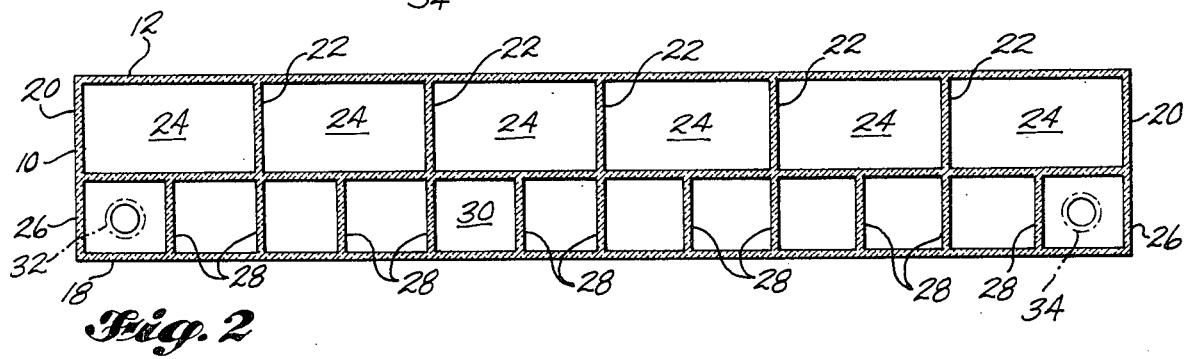
FIG. 2 is a cross section through a glass solar heat collector panel.
Figure 3:
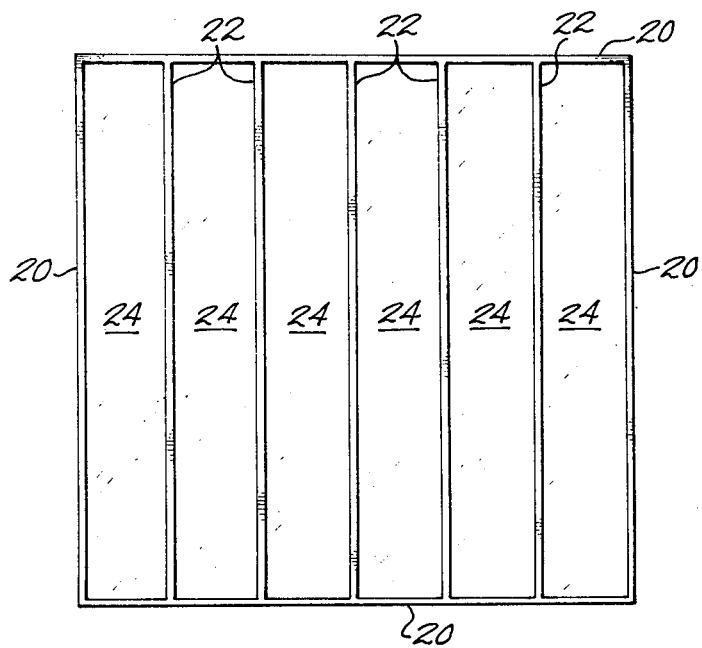
FIG. 3 is a top view of the vacuum cell layer of a glass solar heat collector panel.

Referring to FIG. 1, the preferred embodiment of the present invention is an all-glass composite structure as shown. The structure consists of an insulation layer 10 bounded by a top glass plate 12 and a middle glass plate 14 and liquid path layer 16 bounded by a bottom glass plate 18 and the middle glass plate 14. The internal structure of insulation layer 10 is defined by external glass insulator walls 20 and internal glass insulator walls 22 which are fused to the top glass plate 12, the middle glass plate 14, and each other at all points of contact as shown in FIG. 1 and FIG. 2 to form a series of contiguous cells 24 as shown in FIG. 3. As part of the forming process, the cells 24 are substantially evacuated to form a partial vacuum which provides the insulating characteristics of the insulation layer 10.

Figure 4:
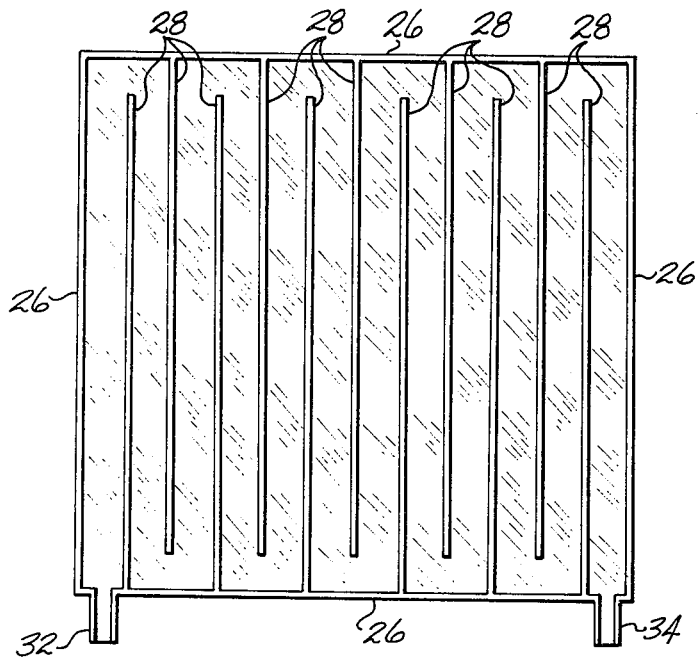
FIG. 4 is a top view of the liquid path layer of a glass solar heat collector panel.

The internal structure of liquid path layer 16 is defined by external glass liquid walls 26 and internal glass liquid walls 28 which are fused to the bottom glass plate 18, the middle glass plate 14, and each other at all points of contact as shown in FIG. 1 and FIG. 2 to form a serpentine path 30 for liquid flow as shown in FIG. 4. A liquid inlet pipe 32 and a liquid outlet pipe 34 are provided in external glass liquid walls 26 at opposite ends of the serpentine path 30.

Figure 5:
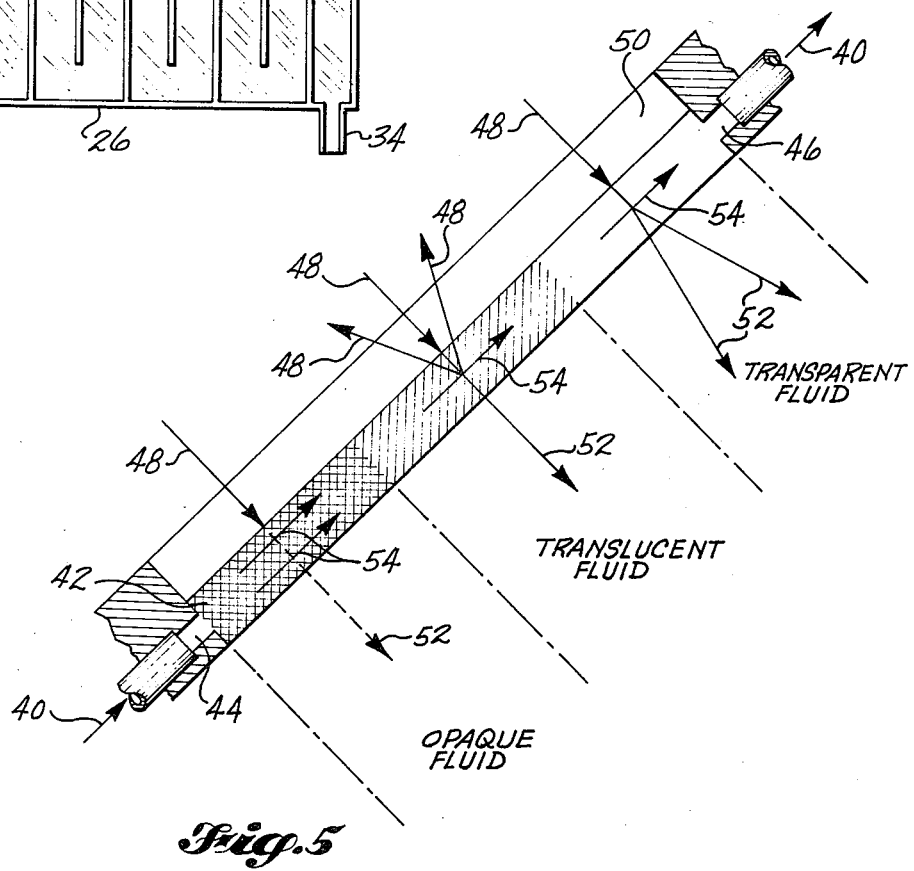
FIG. 5 is representative of the three basic modes of operation of the present invention when employed in its primary function as a solar energy collector panel.

When used in its primary function as a solar energy collector panel, the present invention is contemplated as operating in three basic fluid modes as shown in FIG. 5. Many variations and degrees of operation are possible since the energy is absorbed directly by the fluid, however, each can be identified with one of the three basic modes to be described. As depicted in FIG. 5, a liquid 40 enters the liquid path layer 42 at liquid inlet pipe 44, passes through the liquid path layer 42 and exits via the liquid outlet pipe 46. Rays of solar energy 48 pass through the insulation layer 50 to the liquid 40 where it is converted to varying degrees of light 52 and heat 54. If the liquid 40 is substantially transparent as depicted by the upper portion of FIG. 5 the light 52 transmitted to the interior of the building will be maximum and some heat 54 will be generated. This configuration would optionally be for a mild winter condition where light is needed to offset the gloom.

If the liquid 40 is substantially translucent, possibly containing reflective characteristics, as shown in the middle portion of FIG. 5, the solar energy 48 will be partially reflected and only partially converted to light 52 and heat 54. This mode of operation is the most adaptable and represents one of the major points of novelty of the present invention over the prior art.

Finally, if the liquid 40 is substantially opaque as shown in the bottom portion of FIG. 5, the solar energy 48 will be virtually totally converted to heat 54 with little or no light 52 transmitted to the interior of the building. This configuration would be particularly useful to gather heat for operation of air conditioning equipment in areas of extreme sunlight and temperature.

In conjunction with the present discussion it is important to note that the panel and use of various colors of liquid need not be coupled with addition of heat to or subtraction of heat from the circulated liquid. The panel can be used in essence as an integral shade. For shade from the sun or privacy, an opaque, metallic, or colored liquid could be pumped through the panel. To admit light, a transparent liquid would be substituted.

Figure 6:
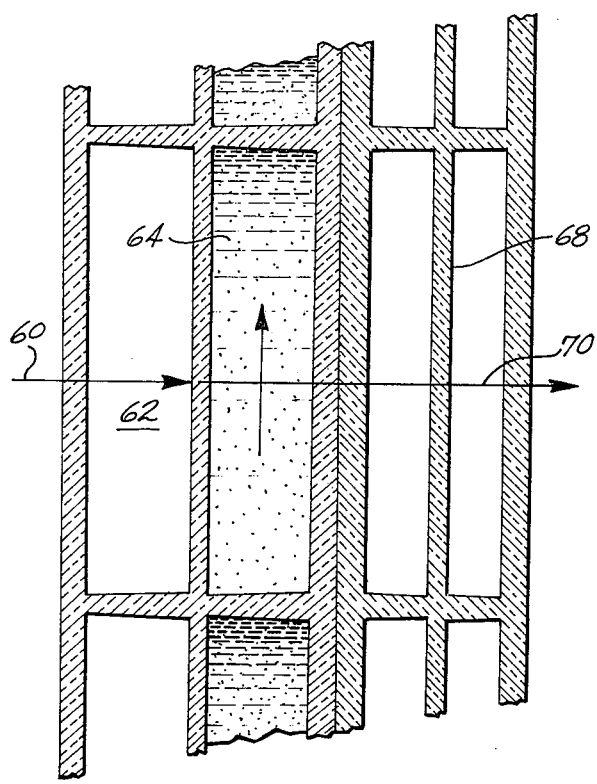
FIG. 6 is a cross section through a glass solar energy collector panel as mounted vertically as a wall panel with a secondary insulation panel to prevent heat radiation internally.

FIGS. 6 through 9 show the composite glass panel which is the subject of the present invention in non-conventional applications possible because of its unique features. FIG. 6 is a partial section through a panel as herein disclosed as would be used as a segment of and incorporated into a building wall where no interior radiation of heat was desired. Solar energy 60 would pass through external insulation layer 62 to liquid 64. Any heat 66 generated would be prevented from leaving the liquid 64 to either the outside of the building or the inside of the building by external insulation layer 62 and internal insulation layer 68. The use of a second glass internal insulation layer 68 would allow the passage of light 70 into the interior of the building. Where light passage was not desired the internal insulation could be of standard insulation materials.

Figure 7:
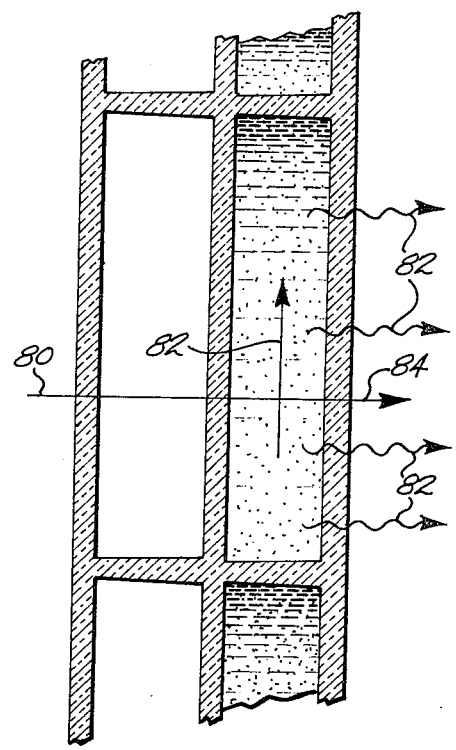
FIG. 7 is a cross section through a glass solar energy collector panel as mounted vertically as a wall panel in a manner to act as an internal radiator.

FIG. 7 depicts the same wall panel configuration as FIG. 6 with the internal insulation layer omitted. In this configuration, solar energy 80 would be converted to heat 82 and light 84 as before. Heat 82 however would radiate into the interior of the building from the interior surface of the bottom glass plate 86.

Figure 8:
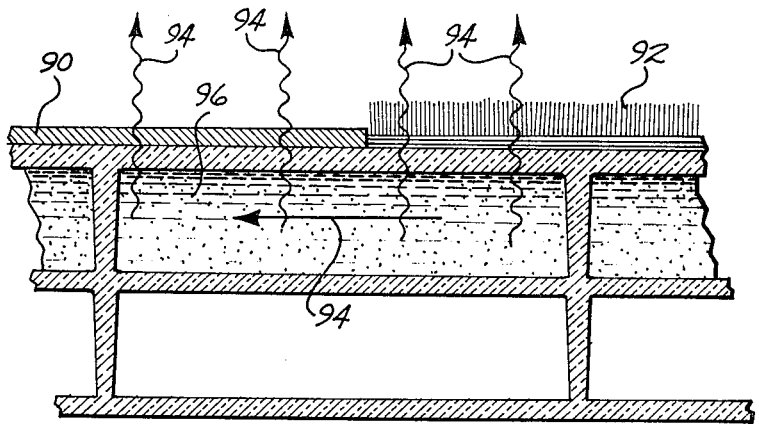
FIG. 8 is a cross section through a glass composite panel as disclosed by the present invention in its secondary use as a floor panel/heating or cooling radiator.

FIG. 8 shows the radiating panel of FIG. 7 in its secondary configuration as a floor panel. In this use the panel forms a portion of the building floor. (The panel could also form a portion of an interior wall or ceiling.) Tile 90 or carpeting 92 could be added to provide a more conventional interior surface. Heat 94 would be added to liquid 96 from an outside source such as a boiler as needed. Heat 94 would then radiate into the interior of the building to add heat. Likewise, the liquid 96 could be cooled to draw heat from the interior of the building for air conditioning purposes.

While the configuration described here to fore is the primary use configuration presently contemplated for the present invention, the two other configurations previously mentioned have significant value when used alone or in combination with the primary configuration.

The first secondary configuration to be considered is that of two layers of vacuum cells. Both layers would be contiguous vacuum cells as depicted in FIG. 3. Such a panel would be strong and a good insulator. A typical use would be as in the insulation/light conductive panel 68 of FIG. 6.

Figure 9:
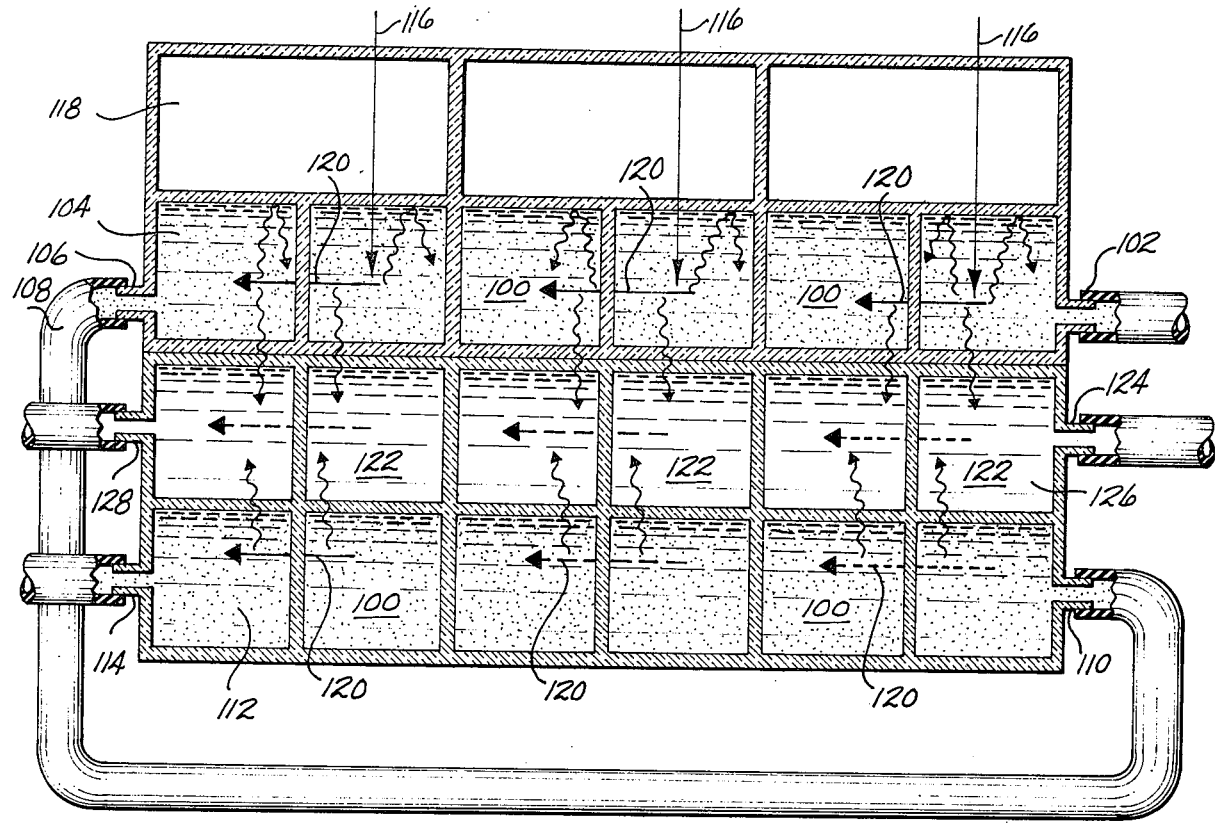
FIG. 9 is a cross section through two glass composite panels connected as a heat exchanger.

The second secondary configuration is that of two layers of liquid serpentine path as depicted in FIG. 3. As presently contemplated, this configuration could be used in conjunction with the primary configuration to provide a heat exchanger. This mode of operation is shown in FIG. 9. Black liquid 100 is pumped in entry pipe 102, through first liquid path 104, out exit pipe 106, through interconnecting pipe 108, in inlet pipe 110, through third liquid path 112, and out exit pipe 114. Solar energy 116 enters through insulation layer 118 and is converted to heat 120 in liquid 100. The liquid to be heated 122 (e.g. house water) enters inlet pipe 124, passes through second liquid path 126, absorbs heat 120 from black liquid 100, and exits from exit pipe 128.

As presently contemplated, the preferred embodiment of the panels disclosed by the present invention would be approximately four feet square, which represents one-half a sheet four feet by eight feet, which is a standard construction unit - being the standard size of plywood, gypsum, and insulated sheathing. Two glass panels would, therefore, replace one standard construction unit.

Additional absorption of heat from the solar energy striking the panel while maintaining the benefits of an all glass panel as hereinbefore described can be realized by the methods disclosed in FIGS. 10(a), 10(b), and 10(c) of adding a heat absorptive material within the liquid passageway. In the embodiments disclosed therein, there is a solar panel 130 comprised of all glass walls 132 defining vacuum cells 134 and liquid passageways 136. In FIGS. 10(a), 10(b), and 10(c) additional means are disposed within the liquid passageways 136 for absorbing solar heat and transmitting it to the liquid 138 moving through liquid passageways 136.

In the embodiment of FIG. 10(a), a membrane 140 is disposed within liquid passageways 136. By folding the membrane 140 as shown, additional surface area is provided. As the liquid 138 moves through liquid passageways 136 the membrane 140 is heated by solar energy along with liquid 138. The heat absorbed by the membrane 140 is then transmitted to the liquid 138 from both surfaces of membrane 140. Membrane 140 can be completely darkened or colored to provide a balance between additional heat absorption and light transmittal.

In the embodiment of FIG. 10(b), a darkened fibrous or porous material 142 is disposed within liquid passageways 136 to act in the same manner as described above. In the embodiment of FIG. 10(c), porous darkened membranes 144 are disposed within the liquid passageways 136. The use of a porous membrane 144 provides a large surface area for the transmittal of heat from the membrane 144 to the liquid 138. Thus, the use of a heat absorptive and retransmittal material of high surface area contained within an all glass solar panel provides not only direct heat absorption by the liquid from the solar energy passing therethrough, but also provides in addition, the absorption and retransmittal to the liquid by a darkened surface of much greater surface area than the conventional metallic tube solar panel.

Having thus described our invention, what is claimed is:

1. An all glass building panel having a first enclosed space layer and a second enclosed space layer wherein:

a. the portion of said all glass building panel containing said first enclosed space layer comprises contiguous evacuated cells being comprised of;

a first outer glass plate, first external glass walls fused to said first outer glass plate, one edge of said first external glass walls being fused to the circumferal edge of said first outer glass plate, said first external glass walls forming the closed external boundaries of said first enclosed space layer, first internal glass walls fused to said first outer glass plate, one edge of said first internal glass walls being fused to said first outer glass plate within the boundaries of said first external glass walls to define the internal structure of said first enclosed space layer, and a middle glass plate fused along its circumferal edge to the edge of said first external glass walls opposite the edge of said first external glass walls fused to said first outer glass plate and fused to the edge of said first internal glass walls opposite the edge of said first internal glass walls fused to said first outer glass plate; and, b. the portion of said all glass building panel containing said second enclosed space layer comprises a serpentine path for liquid flow therethrough, said serpentine path having integral means for ingress and egress of liquid thereto and therefrom, said serpentine path having a membrane disposed therein for absorbing solar energy and transmitting said absorbed solar energy to the liquid disposed therein, said second enclosed space layer being comprised of;

second external glass walls fused to said middle glass plate, one edge of said second external glass walls being fused to the circumferal edge of said middle glass plate, said second external glass walls forming the closed external boundaries of said second enclosed space layer, second internal glass walls fused to said middle glass plate, one edge of said second internal glass walls being fused to said middle glass plate within the boundaries of said second internal glass walls to define the internal structure of said second enclosed space layer, and a second outer glass plate fused along its circumferal edge to the edge of said second external glass walls opposite the edge of said second external glass walls fused to said middle glass plate and fused to the edge of said second internal glass walls opposite the edge of said second internal glass walls fused to said middle glass plate.

2. An all glass building panel comprising a first layer of glass, a second layer of glass, and a third layer of glass wherein:

a. said first layer of glass, said second layer of glass, and said third layer of glass are substantially parallel to each other;

b. said second layer of glass is disposed between said first layer of glass and said third layer of glass;

c. said second layer of glass has first integral raised walls on one surface and second intergral raised walls on the opposite surface;

d. the top edge of said first integral raised walls of said second layer of glass is fused to the adjacent surface of said first layer of glass forming a first enclosed space between said first layer of glass and said second layer of glass, said first enclosed space being comprised of contiguous evacuated cells; and, e. the top edge of said second integral raised walls of said second layer of glass is fused to the adjacent surface of said third layer of glass forming a second enclosed space between said second layer of glass and said third layer of glass, said second enclosed space comprising a serpentine path for liquid flow therethrough, said serpentine path having integral means for ingress and egress of liquid thereto and therefrom, said serpentine path having a membrane disposed therein for absorbing solar energy and transmitting said absorbed solar energy to the liquid disposed therein.

* * * * *